United States Patent [19]

Pettersson

[11] Patent Number: 4,569,330

[45] Date of Patent: Feb. 11, 1986

[54] SOLAR-ENERGY COLLECTOR THAT IS PROTECTED AGAINST CORROSION

[76] Inventor: Birger Pettersson, Badvagen 7, S-139 00 Varmdo, Sweden

[21] Appl. No.: 649,005

[22] Filed: Sep. 10, 1984

[51] Int. Cl.[4] .............................................. F24J 2/46
[52] U.S. Cl. .................................. 126/418; 126/450; 52/171
[58] Field of Search ............... 126/426, 418, 422, 448, 126/444, 450, 417; 428/34; 52/171, 172

[56] References Cited

U.S. PATENT DOCUMENTS 4,055,163 10/1977 Costello et al. ................. 126/450
4,096,861 6/1978 Bowles ............................ 126/422
4,290,419 9/1981 Rabedeaux ..................... 126/450

FOREIGN PATENT DOCUMENTS 2626974 12/1977 Fed. Rep. of Germany ...... 126/450

Primary Examiner—James C. Yeung
Attorney, Agent, or Firm—Sughrue, Mion, Zinn, Macpeak & Seas

[57] ABSTRACT

A solar-energy collector has an absorber (2) which is located in a closed space which communicates with a container (10) of variable volume through a pipeline. In order to prevent aging, oxidation and corrosion, the container (10) and the solar-energy collector (1) are filled with an inert gas, preferably nitrogen gas, and the container (2) has a wall made of a readily flexible, diffusion-tight material, and a volume which is so adjusted that gas flowing from and to the collector (1) at all occurring temperatures can be respectively accommodated by and discharged from said container without resulting in any appreciable change in pressure.

4 Claims, 3 Drawing Figures

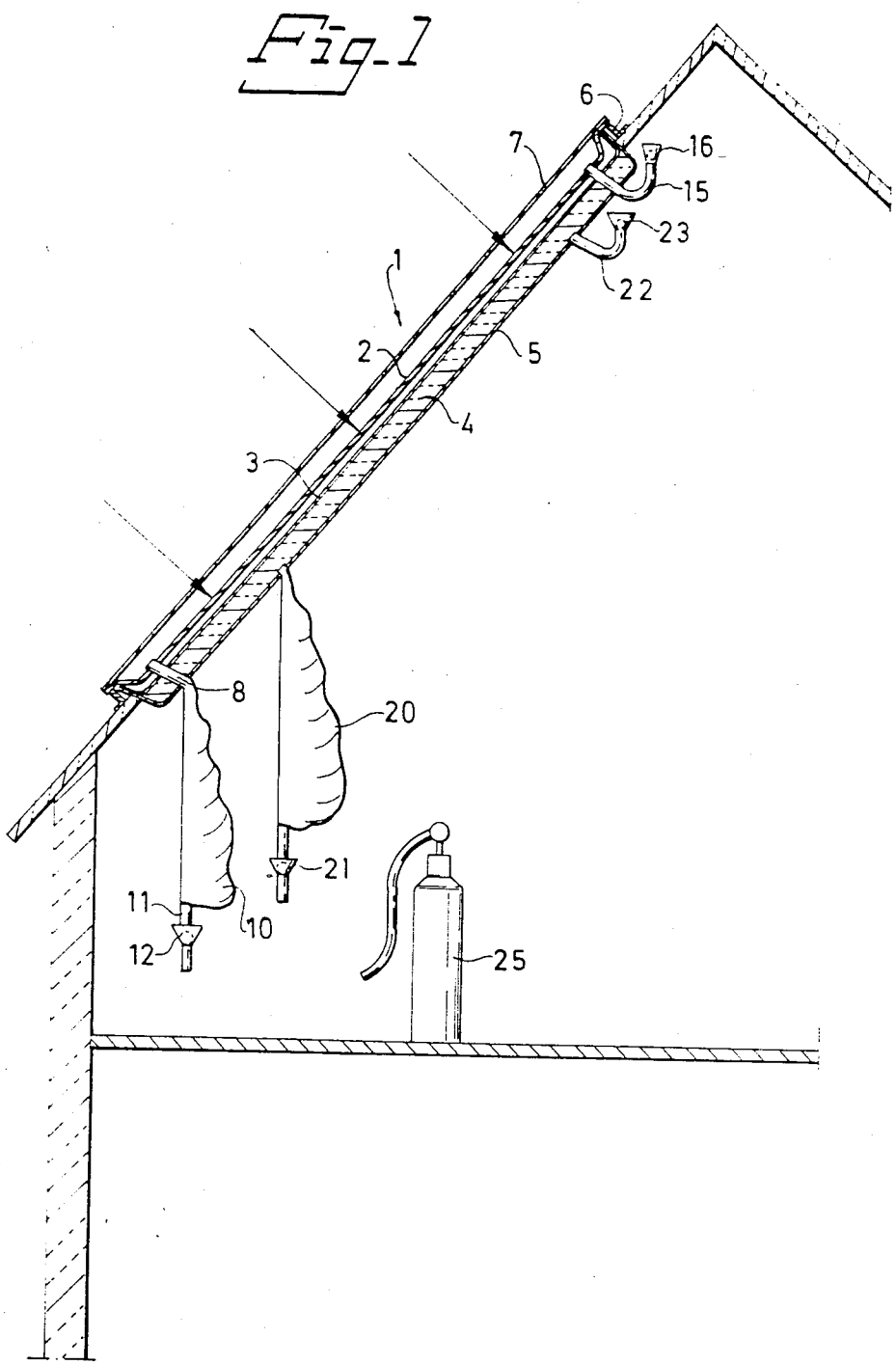

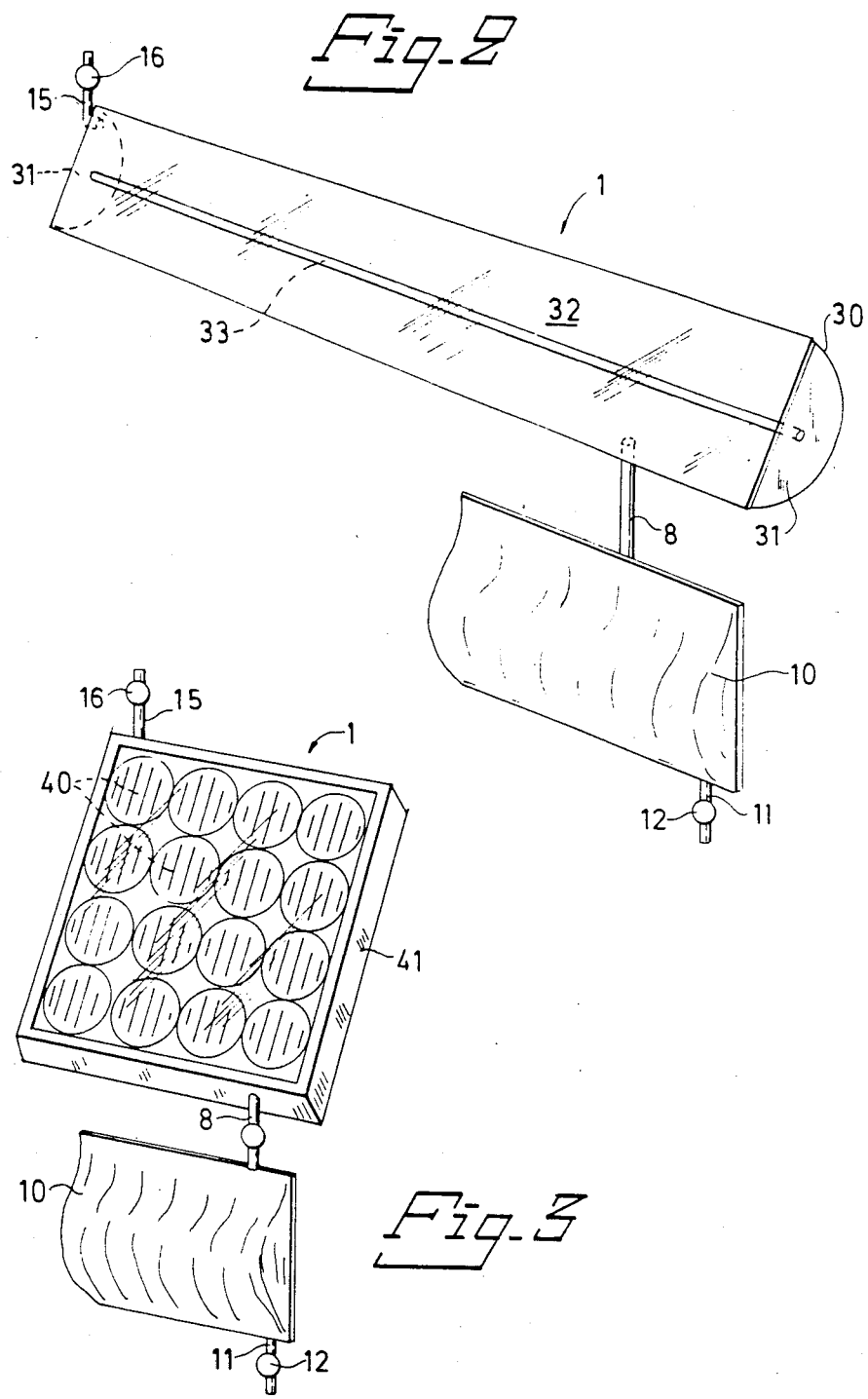

SOLAR-ENERGY COLLECTOR THAT IS PROTECTED AGAINST CORROSION

The present invention relates to a solar-energy collector of the kind which includes a solar-heat absorber mounted in a substantially rigid closed casing having a front side which is permeable to solar radiation and having arranged in said casing an opening which is sealingly connected to a container of variable volume.

It is generally known that solar-energy collectors of this kind are subjected to troublesome stresses and strains due to the extreme changes in temperatures which can occur several times each day, as a result of variations in the extent to which the collector is irradiated by the rays of the sun. As a result hereof, the material from which the collector is made is liable to age quickly and to become deformed in a short period of time. Consequently, the choice of materials used must be made with care, and attention must be paid to the avoidance of thermal stresses.

One problem particularly difficult to master is that large quantities of condensation are liable to form in the casing, resulting in damage due to corrosion, damage to the insulating materials present, and impaired efficiency, this latter being due to the fact that the condensation formed reduces the optical properties of the solar-energy collector. Examples in this respect include the formation of droplets on the inside of the cover glass, light coatings on absorber surfaces, dark coatings on mirror surfaces, the suction of water through cracks in the casing when a subpressure occurs in the casing, and rupture damage caused by ice formation, especially when the collector lies idle in the wintertime. By arranging ventilating holes in the casing, it is possible to cause momentarily formed condensation to gradually disappear. Naturally, such a measure will result in some loss of heat, although more importantly it will result in further condensation being formed at a rate faster than condensation and moisture can be ventilated off under unfavourable conditions, due to air being constantly pumped out of and into the casing through the ventilation holes in time with the raising and lowering of the temperature of the air in the casing. When the air is heated, dry air will pass out through the ventilating holes first. The dry air is then followed by moist air, at which stage further condensation has begun to form.

When the air is cooled, moist, ambient air is often drawn into the casing interior. Consequently, attempts have been made to arrange moisture-absorbing devices in ventilation passages, optionally in combination with elastic, resilient wall portions or wall-like expansion vessels, in order to decrease the amount of moist air which need be de-moisturized in the moisture-absorbing devices.

The moisture-absorbing devices require attention, and must be regenerated or exchanged when necessary, these servicing operations requiring the use of trained personnel. The problems associated with oxidation, aging and coatings remain, however, and despite the reduction in the tendency of the collector to corrode it is still necessary to pay careful attention to the materials selected, in order to prevent damage occurring.

The object of the present invention is to eliminate these disadvantages and prevent damage to the solar-energy collector in a simple fashion, and also to enable inexpensive materials to be used.

This object has been achieved in accordance with the invention by means of a solar-energy collector having the characterizing features set forth in the following claims. Because, in accordance with the invention, one and the same volume of inert gas is always enclosed in the solar-energy collector casing and the flexible container, it is ensured from the very beginning that no moisture and no oxygen can be present in the collector. Consequently, it is not possible for corrosion or oxidation to take place, and as a result hereof it is possible to use inexpensive, corrosive material in the collector. For example, the absorber can be made of conventional carbon steel.

The invention will now be described in more detail with reference to the accompanying drawings, which schematically illustrate different embodiments of solar-energy collectors according to the invention, in which drawings FIG. 1 is a cross-sectional view of a solar-energy collector incorporated in the roof of a building;

FIG. 2 is a perspective view of a rod-like, concentrating solar-energy collector constructed in accordance with the invention, and FIG. 3 is a perspective view of a photo-cell type solar-energy collector.

The solar-energy collector 1 illustrated in FIG. 1 has an absorber 2 through which water is intended to flow and which is provided with connectors not shown. The absorber 2 is placed in a tray 3 which is made of some suitable material, for example a plastics material, and which has been pressed to the desired form or shape. Heat-insulating material 4 is enclosed on the rear side of the tray 3, between said tray and a similar plastics back piece 5. The trays 3 and 5 together with the absorber 2 are sealingly connected around their respective peripheries and suspended on a frame 6. Positioned above the absorber 2 is a planar plate 7 made of a material which is permeable to solar radiation. The plate 7 is sealingly connected with the absorber 2 around the periphery. A pipeline 8, which communicates with both the space above and below the absorber 2, extends through the insulating material 4 and the tray 3 and the back-piece 5 to an elongate, closed container 10 made of an extremely readily flexed, diffusion-tight material, such as a thin-walled, plastics-aluminium-foil laminate for example. Arranged in the under edge of the container 10 is a pipe connection 11 in which there is incorporated a check valve 12.

A pipeline 15 corresponding to the pipeline 8 is arranged in the upper part of the solar-energy collector, the pipeline 15 also being provided with a check valve, here referenced 16.

The space between the trays 3 and 5 is also provided with a container 20 having a check valve 21, similar to the container 10 and the check valve 12. Arranged in the upper region of this interspace is a pipeline 22 having an associated check valve 23.

The intention with the illustrated embodiment is to connect a pressure vessel 25 containing a suitable insert gas, preferably nitrogen gas, temporarily to the containers 10 and 20, via the check valves 12 and 21, so as to enable said gas to be blown through respective containers and the collector spaces, whereupon the air initially enclosed, and then the surplus gas, depart through the check valves 16 and 23.

The embodiment shown has been selected to illustrate the invention clearly. In practice, it is more suitable for the containers 10 and 20 to be let into the out-side of the tray, protected by a perforated plate. In this case, the containers are suitably filled with gas during manufacture, in which case the check valves can optionally be replaced with closure valves. If the insulating material is of a kind which is not sensitive to moisture, the container 20 can be omitted.

The solar-energy collector illustrated in FIG. 2 has a parabolic tray 30, having walls 31 and a cover glass 32, which is intended to shield the reflective surface of the tray 30. Arranged in the branch line of the tray 30 is a tubular absorber 33. The FIG. 2 embodiment also has suspended beneath the collector a container 10 which is connected to the tray 30 of said collector through a pipeline 8. An outlet line 15 incorporating a valve is arranged at one end wall 31. In practice, the container is conveniently placed on the rear side of the tray 30.

FIG. 3 illustrates corresponding arrangements in a solar-energy collector having a plurality of photo cells 40 placed in a casing 41, which is closed.

I claim:

1. A solar-energy collector of the kind which includes a solar-energy absorber (2) mounted in a substantially rigid, closed casing having a front side (7) which is permeable to solar radiation and also having arranged in said casing an opening which is sealingly connected to a container (10) of variable volume, characterized in that the container (10) has a wall made of a readily flexible, diffusion-tight material and, together with the interior of the collector casing, is filled with a dry inert gas which counteracts aging and/or oxidation or corrosion of components present within the casing of the solar-energy collector; in that the volume of the container (10) and the amount of ingoing inert gas are so mutually adjusted that the container, without being completely emptied or completely filled, is able to accommodate the amount of gas which is not accommodated in the collector casing, at all normally occurring temperature conditions; in that the readily flexible container-wall material (10, 20) is a plastics-aluminum-foil laminate; and in that the space containing said inert gas has an outlet line (15, 22) provided with a check valve (16, 23), for discharging any surplus of inert gas.

2. A solar-energy collector according to claim 1, characterized in that heat-insulating material (4) present is arranged in a separate chamber which is arranged in the collector casing and which is separated from the space containing said inert gas and communicates with a further container (10) of variable volume, said further container being constructed and dimensioned in a manner similar to the aforesaid container (10), and together with the chamber containing the insulating material (5) is also filled with a suitable amount of dry inert gas.

3. A solar-energy collector according to claim 1 or 2, characterized in that the absorber (2) of said collector mainly comprises conventional sheet iron which has not been substantially treated against corrosion.

4. A solar-energy collector according to claim 1 or 2 wherein said gas is nitrogen.

* * * * *